US008108931B1

(12) United States Patent
Witten et al.

(10) Patent No.: US 8,108,931 B1
(45) Date of Patent: Jan. 31, 2012

(54) METHOD AND APPARATUS FOR IDENTIFYING INVARIANTS TO DETECT SOFTWARE TAMPERING

(75) Inventors: Brian T. Witten, Reston, VA (US); Matthew C. Elder, Germantown, MD (US)

(73) Assignee: Symantec Corporation, Mountain View, CA (US)

( * ) Notice: Subject to any disclaimer, the term of this patent is extended or adjusted under 35 U.S.C. 154(b) by 810 days.

(21) Appl. No.: 12/059,458

(22) Filed: Mar. 31, 2008

(51) Int. Cl.
*G06F 11/00* (2006.01)
*G06F 12/14* (2006.01)
*G08B 23/00* (2006.01)

(52) U.S. Cl. ............... 726/23; 726/22; 726/24; 726/25; 726/26

(58) Field of Classification Search ................... None
See application file for complete search history.

(56) References Cited

U.S. PATENT DOCUMENTS

| 5,485,575 | A  | * | 1/1996  | Chess et al. ............... 714/38.13 |
|-----------|-----|---|---------|---------------------------------------|
| 7,631,357 | B1 | * | 12/2009 | Stringham ................... 726/24   |
| 7,664,754 | B2 | * | 2/2010  | Shipp ........................ 726/24  |
| 7,779,394 | B2 | * | 8/2010  | Homing et al. .............. 717/136   |
| 7,921,461 | B1 | * | 4/2011  | Golchikov et al. ............ 726/23   |
| 2004/0255163 | A1 | * | 12/2004 | Swimmer et al. ............. 713/201 |
| 2006/0031686 | A1 | * | 2/2006  | Atallah et al. ............... 713/190 |
| 2007/0067623 | A1 | * | 3/2007  | Ward ............................. 713/164 |
| 2007/0261120 | A1 | * | 11/2007 | Arbaugh et al. ................ 726/26 |
| 2008/0127341 | A1 | * | 5/2008  | Chen et al. .................... 726/22 |
| 2008/0127346 | A1 | * | 5/2008  | Oh et al. ....................... 726/23 |
| 2008/0235802 | A1 | * | 9/2008  | Venkatesan et al. ............ 726/26 |
| 2008/0256633 | A1 | * | 10/2008 | Arnold et al. .................. 726/22 |
| 2008/0271140 | A1 | * | 10/2008 | Brinker et al. ................. 726/21 |

OTHER PUBLICATIONS

Li, Wei-Jen et al., "A Study of Malcode-Bearing Documents," downloaded from web site xon Aug. 5, 2008, pp. 1-20.
Fraser, Timothy, "Automatic Discovery of Integrity Constraints in Binary Kernel Modules," Dec. 17, 2004, pp. 1-13.
Ernst, Michael D. et al., "The Daikon system for dynamic detection of likely invariants," Science of Computer Programming, vol. 69, No. 1-3, Dec. 2007, pp. 35-45.
Xiao, Chen, "Performance Enhancements for a Dynamic Invariant Detector," Masters thesis, MIT Department of Electrical Engineering and Computer Science (Cambridge, MA), Feb. 2007.

(Continued)

*Primary Examiner* — Nathan Flynn
*Assistant Examiner* — Trang Doan
(74) *Attorney, Agent, or Firm* — Wilmer Cutler Pickering Hale and Dorr LLP

(57) ABSTRACT

Various embodiments of a method and an apparatus for identifying invariants to detect software tampering is disclosed. In one embodiment, a method of identifying invariants associated with a software package comprises applying a machine learning technique to a plurality of images associated with a software package to identify a memory location within the plurality of images to be a candidate invariant, wherein the plurality of images comprises images of memory used during execution of the software package and determining an invariant based on the candidate invariant.

19 Claims, 3 Drawing Sheets

OTHER PUBLICATIONS

Perkins, Jeff H. et al., "Efficient Incremental Algorithms for Dynamic Detection of Likely Invariants." In Proceedings of the ACM SIGSOFT 12th Symposium on the Foundations of Software Engineering (FSE 2004), (Newport Beach, CA, USA), Nov. 2-4, 2004, pp. 23-32.

Dodoo, Nii et al., "Selecting Predicates for Implications in Program Analysis," Mar. 16, 2002. Draft. Downloaded web site http://pag.csail.mit.edu/~mernst/pubs/invariants-implications.ps on Aug. 5, 2008.

Ernst, Michael D. et al., "Dynamically Discovering Likely Program Invariants to Support Program Evolution," IEEE Transactions on Software Engineering, vol. 27, No. 2, Feb. 2001, pp. 99-123.

Ernst, Michael D., "Dynamically Discovering Likely Program Invariants," Ph.D. dissertation, University of Washington Department of Computer Science and Engineering (Seattle, Washington), Aug. 2000.

Ernst, Michael D. et al., "Quickly Detecting Relevant Program Invariants." In ICSE 2000, Proceedings of the 22nd International Conference on Software Engineering (Limerick, Ireland), Jun. 7-9, 2000, pp. 449-458.

Ernst, Michael D. et al., "Dynamically Discovering Program Invariants Involving Collections," University of Washington Department of Computer Science and Engineering technical report UW-CSE-99-11-02 (Seattle, WA), Nov. 16, 1999. Revised Mar. 17, 2000.

* cited by examiner

METHOD AND APPARATUS FOR IDENTIFYING INVARIANTS TO DETECT SOFTWARE TAMPERING

GOVERNMENT RIGHTS IN THIS INVENTION

This invention was made with Government support under Contract FA8750-08-9-0009 awarded by the Air Force. The Government has certain rights in this invention.

BACKGROUND OF THE INVENTION

1. Field of the Invention

Embodiments of the present invention generally relate to securing computer systems and, more particularly, to a method and apparatus for identifying invariants to detect software tampering.

2. Description of the Related Art

A computer is a basic necessity for almost every single person in the world. Generally, computers are regularly used for a variety of applications, for example, communication with other computers and/or people, entertainment, occupational productivity, business applications, personal or social applications and the like. Various software packages are installed on the computer and designed to utilize one or more computer resources to enable the performance of such applications. As the usage of computers increases, threats to operations at the computer also increase. Malware is one of the most predominant threats.

Generally, malware (i.e. malicious software code) is configured to surreptitiously disrupt and degrade the stability and performance of the computer. As a result, the computer ceases to operate properly. One of the current techniques used by malware to avoid detection by security software (e.g., SYMANTEC NORTON products) is to bury itself within a memory space (e.g., includes a working set and file system structures) of a legitimate operating system and/or a software application component. Certain software applications, such as security software, utilize complex mechanisms for protection from tampering and subversions. Regardless, many software applications are unable to detect such tampering perpetrated by malware. Due to improvements in the functionality of malware, legitimate operating system and software applications are increasingly vulnerable to malicious attacks (tampering). As a result, ensuring software integrity has become a growing concern.

One of the methods for verifying software integrity of a particular software application is to specify invariants, such as memory invariants and virtual machine invariants, and determine whether any of the specified invariants are present in one or more images (e.g., virtual machine images, memory images and the like) associated with the particular software application. Generally, memory invariants comprise static invariants in which byte sequences in memory do not change with multiple executions of the particular software application or semantic invariants in which relationships between the byte sequences in the memory do not change. Accordingly, virtual machine invariants are byte sequences or relationships between byte sequences in a virtual machine image that do not change. For example, if a first field is associated with a first value, then a second field is associated with a second value. Furthermore, the first value and second value may be semantically consistent even if the first value and second value are not literally consistent. For example, the first field may always be associated with an address of a static invariant regardless of where the static invariant is located in the memory or the image (e.g., virtual machine image).

The presence of the specified invariants denotes a strong likelihood that the particular software application has not been tampered. On the other hand, the absence of one or more of the specified invariants signifies a potential tampering with the particular software application. For example, malicious software code may hide in an area of memory associated with a particular invariant. Hence, a subsequent image does not include the particular invariant because the malicious software code resides in the area of memory previously occupied by the particular invariant. As such, the determination of an absence of the particular invariant from the subsequent image indicates an attack on the particular software application by the malicious software code.

Unfortunately, the specification of the invariants used for the prevalent software integrity verification method described above is limited to a static, manual analysis of the images. In other words, such a method requires a human analyst to produce a set of invariants associated with a software application for monitoring a system. Moreover, the set of invariants is produced by manually analyzing the images and the software documentation. Using the human analyst to perform such a manual analysis is time consuming, costly and inefficient. Accordingly, such a method does not apply machine learning techniques to the images to determine the set of invariants.

Accordingly, there is a need in the art for a method and an apparatus for identifying reliable invariants to detect software tampering where the reliable invariants were determined through a dynamic analysis of images using machine learning techniques.

SUMMARY

Embodiments of the present invention comprise a method and an apparatus for identifying invariants to detect software tampering. In one embodiment, a method for identifying invariants to associated with a software package comprises applying a machine learning technique to a plurality of images associated with a software package to identify a memory location within the plurality of images to be a candidate invariant, wherein the plurality of images comprises images of memory used during execution of the software package and determining an invariant based on the candidate invariant.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
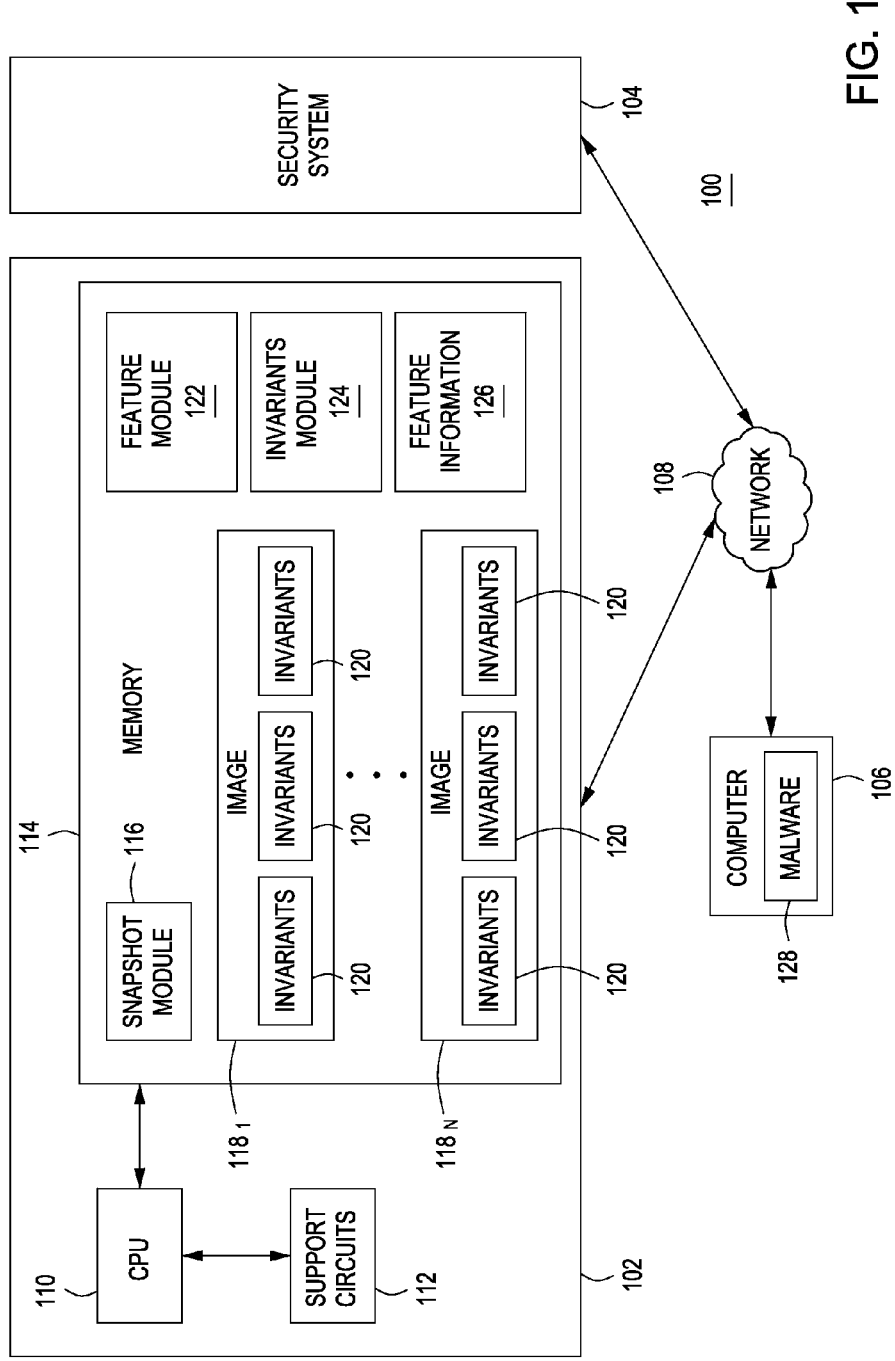
FIG. 1 is a block diagram of a system for identifying invariants to detect software tampering in accordance with one or more embodiments of the present invention.

FIG. 1 is a block diagram of a system 100 for identifying invariants to detect software tampering using machine learning techniques. The system 100 comprises a computer 102, a security system 104 and a computer 106, each coupled to each other through a network 108.

It is appreciated that various embodiments of the system 100 comprise one or more computers that are not coupled to any communication network. For example, the system 100 may comprise the computer 102 and the computer 106 but not the network 108. One or more reliable invariants may be identified from the computer 102 using one or more machine learning techniques without any network access. The one or more reliable invariants may be stored on a physical storage device (e.g., CD or DVD), which is transported to the computer 106 where the one or more reliable invariants are used to detect software tampering.

As described above, hackers desire to surreptitiously invade and disrupt operations at a computer, such as the computer 106. Occasionally, such hackers hide malicious software code and rootkits within a memory space associated with a software package, such as an operating system or software application. Using one or more invariants identified through the computer 102, the security system 104 monitors the computer 106 for software tampering.

The computer 102 is a computing device (e.g., a laptop, a desktop, a tablet, a Personal Desk Assistant (PDA), a mobile phone and the like) that comprises a central processing unit (CPU) 110, various support circuits 112 and a memory 114. The CPU 110 may comprise one or more commercially available microprocessors or microcontrollers that facilitate data processing and storage. The various support circuits 112 facilitate the operation of the CPU 110 and comprise at least one of clock circuits, buses, power supplies, cache, input/output circuits, and the like. The memory 114 comprises at least one of read only memory (ROM), random access memory (RAM), disk drive storage, optical storage, removable storage, and the like. The memory 114 comprises various software packages, such as a snapshot module 116, a feature module 122, and an invariant module 124. The memory 114 further comprises various data, such as feature information 126 and a plurality of images 118 (e.g., disk image files). The plurality of images 118 are illustrated as image $118_1$ ... image $118_n$ and, hereinafter, referred to as the images 118. As explained further below, the images 118 further comprise a plurality of invariants 120, hereinafter, referred to as the invariants 120.

The security system 104 comprises a plurality of computing devices that are configured to secure one or more client computers and systems, such as the computer 102 and the computer 106. Generally, the security system 104 comprises various methods and data for detecting and removing various threats to stability and/or performance of the computer 106, such as viruses, Trojans, malicious software code, rootkits and the like. The security system 104 may form a portion of security subscription service (e.g., SYMANTEC NORTON products) that monitors the computer 106 for any such threats. As explained further below, the security system 104 employs a run-time instantiation of software code for monitoring one or more invariants (e.g., within the computer 106) and detecting software tampering according to one embodiment.

The computer 106 is a computing device that comprises a plurality of computer resources (e.g., computer memory, hardware configurations, registers and the like), which are secured by the security system 104. Furthermore, the computer 106 comprises a malware 128, which is malicious software code configured to disrupt one or more operations at the computer 106. In one embodiment, various software packages are being installed, updated and/or executed within the computer 106 at any given moment. As such, the various software packages are associated with a memory space, which includes a portion of computer memory related to the installation and/or execution of the various software packages at the computer 106. The malware 128 hides within the memory space to avoid detection from the security system 104. For example, the malware 128 may reside in a memory location previously occupied by an invariant associated with a particular software application. Hence, the security system 104 may use one or more invariants of the invariants 120 from the computer 102 to monitor the memory space of the particular software application and/or assess software integrity at the computer 106. Alternatively, the computer 106 includes security software (e.g., SYMANTEC Norton products) that monitors invariants associated with the computer 106 using the one or more invariants of the invariants 120 to detect the malware 128 hiding within the memory space.

The network 108 comprises a communication system that connects computers by wire, cable, fiber optic, and/or wireless links facilitated by various types of well-known network elements, such as hubs, switches, routers, and the like. The network 108 may employ various well-known protocols to communicate information amongst the network resources. For example, the network 108 may be part of the Internet or intranet using various communications infrastructure such as Ethernet, WiFi, WiMax, General Packet Radio Service (GPRS), and the like.

The snapshot module 116 collects the images 118 at various points (e.g., freeze points) during execution of the software package (e.g., an operating system, a software application and/or any component therein). It is appreciated that the execution of the software package includes installation of the software package on the computer 102. In another embodiment, the snapshot module 116 collects the images 118 before and after execution and/or installation of the software package. There are various techniques for selecting freeze points (e.g., saving images for analysis at fixed or periodic time intervals, during a series of operations or before and after installation of the software package on various configurations, trapping on exceptions or other anomalies, using input from traditional behavioral security tools and the like).

As explained above, the images 118 may be generated by the snapshot module 116 at one or more freeze points during the execution of the software package. In one embodiment, the images 118 are generated through a memory dump of the computer 102 (e.g., a translation from a physical machine to a virtual machine and vice versa). Each image of the images 118 is a representation of a virtual machine or a physical machine and comprises each and every portion of the memory 114 that is allocated to or currently in use by the virtual machine or the physical machine. As such, the images 118 comprise working memory associated with the software package. The working memory (e.g., working set) of the software package (e.g., an operating system or a software application) comprises one or more portions of the memory (e.g., pages) allocated to the execution of the software package. As explained further below, the images 118 also comprise the invariants 120 (e.g., invariant byte sequences), which may be used to hide malicious software code. The security system 104 uses the invariants 120 to detect software tampering within a memory space of an executed software package (e.g., at the computer 106) and/or assess software integrity.

In one embodiment, the images 118 are virtual machine images that represent one or more virtualized computing environments (i.e., virtual machines) that operate on the computer 102. Each virtual machine image represents a virtual machine, which includes memory used by the virtual machine for one or more software applications, an operating system and any related data as well as one or more registers, one or more disks (e.g., virtual disk) and/or one or more emulated hardware components. As such, the invariants 120 comprise virtual machine invariants in addition to memory invariants (e.g., semantic invariants and static invariants). Similarly, the virtual machine invariants may be monitored and used to assess software integrity at a system.

In operation, the images 118 are collected during the execution of the software package to determine reliable ones of the invariants 120 associated with the software package. The invariants 120 may be static invariants where the memory location and value remain constant throughout execution of the software package (e.g., an extent with a particular offset in a Virtual Machine Disk file stores file A). The invariants 120 may also be semantic invariants where memory locations and values may change but the relationship between the memory values do not change (e.g., an interrupt handler in the software package will always point to a particular code segment even though the location of the pointer in the images 118 may change). The invariants 120 may also be virtual machine invariants as mentioned above.

In one or more embodiments, the invariants 120 may be used to monitor and assess the integrity of the software package in real time (e.g., by the security system 104). For example, if one of the invariants 120 is violated during a subsequent execution of the software package, then there is a strong likelihood that the malware 128 is hiding in a computer memory (e.g., a working memory) associated with a software package) and/or the malware 128 may have performed an operation to disrupt the execution of the software package. For example, if one of the invariants 120 comprises a pointer (e.g., a reference to an address in a computer memory to a function in an Application Programming Interface (API) or a MICROSOFT shared library (e.g., Dynamic Link Library (DLL file)) but a computer memory within the computer 106 comprises a pointer to another memory location (e.g., another function or data) instead of the function in the DLL file or the API, then there is a strong likelihood that the malware 128 has attacked the computer 106.

The feature module 122 and the invariant module 124 cooperate to identify the invariants 120 from the images 118 using one or more machine learning techniques or algorithms (e.g., decision tree learning, genetic algorithms, probability distribution modeling, dynamic programming algorithms (i.e., longest common subsequence (LCS) algorithms), rule learning algorithms (i.e., classifiers) and clustering algorithms and/or the like). In one embodiment, the feature module 122 uses such machine learning techniques to identify one or more candidate invariants (i.e. features) from the images 118 for extraction. It is appreciated here that the machine learning technique employed by the feature module 122 may be an n-gram analysis, a bloom filter, a LCS algorithm and the like including any combination thereof. In a yet another example of identifying the candidate memory candidates, the feature module 122 flags a memory location of a byte sequence comprising an "opcode" (e.g., read as an "opcode") while preserving a relative positional structure between "opcodes" in the images 118.

By the way of example and not as a limitation, the feature module 122 may apply a bloom filter to the images 118. Generally, bloom filters use hash functions to determine if a particular byte sequence in the images 118 is present amongst the byte sequences in the images 118 identified by the snapshot module 116. If the particular byte sequence is present, then the particular byte sequence is extracted as a candidate invariant. In one embodiment, each hash would represent a longer byte sequence where the longer byte sequence is slid like a window through the images 118 during the extraction of the candidate invariants.

Alternatively, the feature module 122 employs an n-gram analysis to extract one or more candidate invariants (features) from the images 118. Generally, the n-gram analysis includes examining each subsequence of "n" items from a larger sequence. In this embodiment, the feature module 122 examines every "n" bytes in the images 118. In one embodiment, a value of "n" is greater than eight bytes but less than 200 bytes. The value of "n" may increase to be greater than 200 bytes during the analysis in order to make greater values of n computationally feasible.

In one embodiment, the feature module 122 filters the images 118 into a smaller collection of computer memory by identifying first portions of the images 118 that may have changed and second portions that may not have changed between the freeze points. For example, the first portions may be portions of the images 118 that have changed after the installation of the software package because the changed portions form a portion of a memory space associated with the software package. In one or more embodiments, the feature module 122 uses Rabin fingerprints (e.g., a delta compression algorithm) to apply to two or more images of the images 118 (e.g., an image generated before installation or execution and an image generated after installation or execution) in order to filter the images 118. In another embodiment, the feature module 122 flags dirty memory pages to identify portions (i.e., byte sequences) of the images 118 that may have changed between freeze points (e.g., byte sequences there were removed from RAM and written to a hard disk, least recent used byte sequences and the like).

In one or more embodiments, the feature module 122 may generate feature information 126, which includes memory locations for the byte sequences (e.g., the candidate invariants) identified by one or more machine learning techniques. Accordingly, the invariant module 124 applies one or more machine learning techniques (e.g., a classifier and/or a clustering technique) to the identified byte sequences in the feature information 126 to determine the invariants 120 (i.e., feature selection and extraction). In one embodiment, the invariant module 124 confirms one or more of the candidate invariants as the invariants 120 (i.e., reliable invariants that may be used to verify software integrity). For example, a particular candidate invariant may be confirmed as an invariant (i.e., a reliable invariant) if the particular invariant is present throughout most or all of the images 118. In one embodiment, the invariant module 124 classifies and/or clusters the images 118 based on the presence of the candidate invariants in the images 118. Accordingly, one or more images comprising the most common candidate invariants are most like clean or free from tampering, as explained below.

The invariant module 124 further comprises a classifier and/or a clustering technique. The classifier and/or the clustering technique are applied to the byte sequences (features) extracted by the feature module 122 (e.g., the candidate invariants indicated in the feature information 126) to identify the invariant byte sequences (e.g., the invariants 120) according to the presence of the extracted byte sequences within the images 118. For example, the classifier may be a Bayesian Classifier build upon an application of the Bayesian algorithm). In one or more embodiments, the classifier may include a Classification and Regression Trees (CART) classifier, a C4.5 classifier, a RIPPER classifier and/or the like. As another example, the clustering technique may be a K-means technique, a Fuzzy C-means technique, a hierarchical clustering technique and/or a combination of one or more Gaussian techniques.

According to various embodiments of the present invention, the invariant module 124 trains the classifier to classify one or more images based on a presence of the candidate invariants. The one or more images may be associated with various (e.g., same or different) configurations (e.g., hardware or software configurations), operating systems and/or software applications. In one embodiment, the invariant module 124 uses the images 118 to train the classifier. Accordingly, such training enables the classifier to differentiate between any two or more images, such as a clean image and a compromised image. When the classifier is applied to a particular image and classifies the particular image as a clean image, any candidate invariant residing the particular image is most likely a reliable invariant.

Over a period of time, the classifier learns one or more rules for differentiating two or more images (e.g., the clean image and the compromised image). Such rules comprise one or more invariant byte sequences (i.e., the invariants 120). The identified invariant byte sequences are utilized (e.g., by the security system 104) to monitor memory associated with a running operating system and/or software application in real time to ensure software integrity. The one or more compromised images may comprise malicious software code, such as the malware 128. Such malicious software code may reside in a memory location associated with (e.g., previously occupied by or semantically related to) one or more of the invariant byte sequences. As explained herein, the security system 104 detects such software tampering perpetrated by the malicious software code on the computer 106 using the invariant byte sequences (e.g., the invariants 120) according to one embodiment.

For example, in order to classify a MICROSOFT WINDOWS XP image as most likely to be free from software tampering (e.g., devoid of malicious software code and/or comprises reliable invariants) and/or differentiate the MICROSOFT WINDOWS XP image from any other image, the classifier is trained against one or more clean WINDOWS XP images, one or more compromised WINDOWS XP images and/or one or more images from another operating system and/or software application. Similarly, the classifier is trained against one or more images to differentiate an image associated with a legitimate software package (i.e., "goodware") or operating system that has not been tampered from any other image.

In another embodiment, the invariant module 124 applies the clustering technique to the images 118 to determine the invariants 120. In one embodiment, the invariant module 124 may apply the clustering technique to the candidate invariants in order to cluster the images 118 based on similarities related to the candidate invariants. The most common ones of the candidate invariants amongst the image clusters are confirmed as the invariants 120. For example, the images 118 are grouped or clustered according to the presence of the candidate invariants (i.e., identified and extracted features or byte sequences). Once clusters of the images 118 are formed, the candidate invariants present in most or all of the clusters of images 118 are identified as the invariants 120. The invariants 120 are used to monitor and assess the integrity of the operating system and/or software application memory space for a violation of any invariant of the invariants 120. Furthermore, the clustering technique may include a hierarchical agglomerative clustering technique to enable grouping of the images 118 without a priori knowledge of a number of clusters.

In one embodiment, the clustering technique comprises a distance function used to group or cluster the images 118 based on the commonality of the candidate invariants in the images 118. As such, the invariant module 124 forms one or more groups of images having the most common candidate invariants in static memory locations. In another embodiment, the distance function used by the cluster technique may cluster the images 118 according to commonalities between byte sequences independent of their respective memory locations.

As mentioned above, the security system 104 is configured to detect software tampering by monitoring various resources (e.g., computer memory, hardware devices and the like) at the computer 106 and assessing integrity of a software application, an operating system or any component thereof using the invariants 120. For example, if the security system 104 determines that a substantial number of invariants 120 are absent from a memory space related to a particular running software application, then the software application is most likely a victim of software tampering and the computer 106 probably comprises a rootkit, malicious software code (e.g., the malware 128) and/or corrupted data. Accordingly, the security system 104 may alert the user of the tampered computer and/or a security subscription service through the network 108 (e.g., SYMANTEC NORTON online security service). The security system 104 may also identify and remove the malicious software code from the computer 106. Furthermore, the security system 104 may provide the invariant module 116 with one or more images (e.g., memory images or virtual machine images associated with various hardware/software configurations) to be used to train the classifier.

Figure 2:
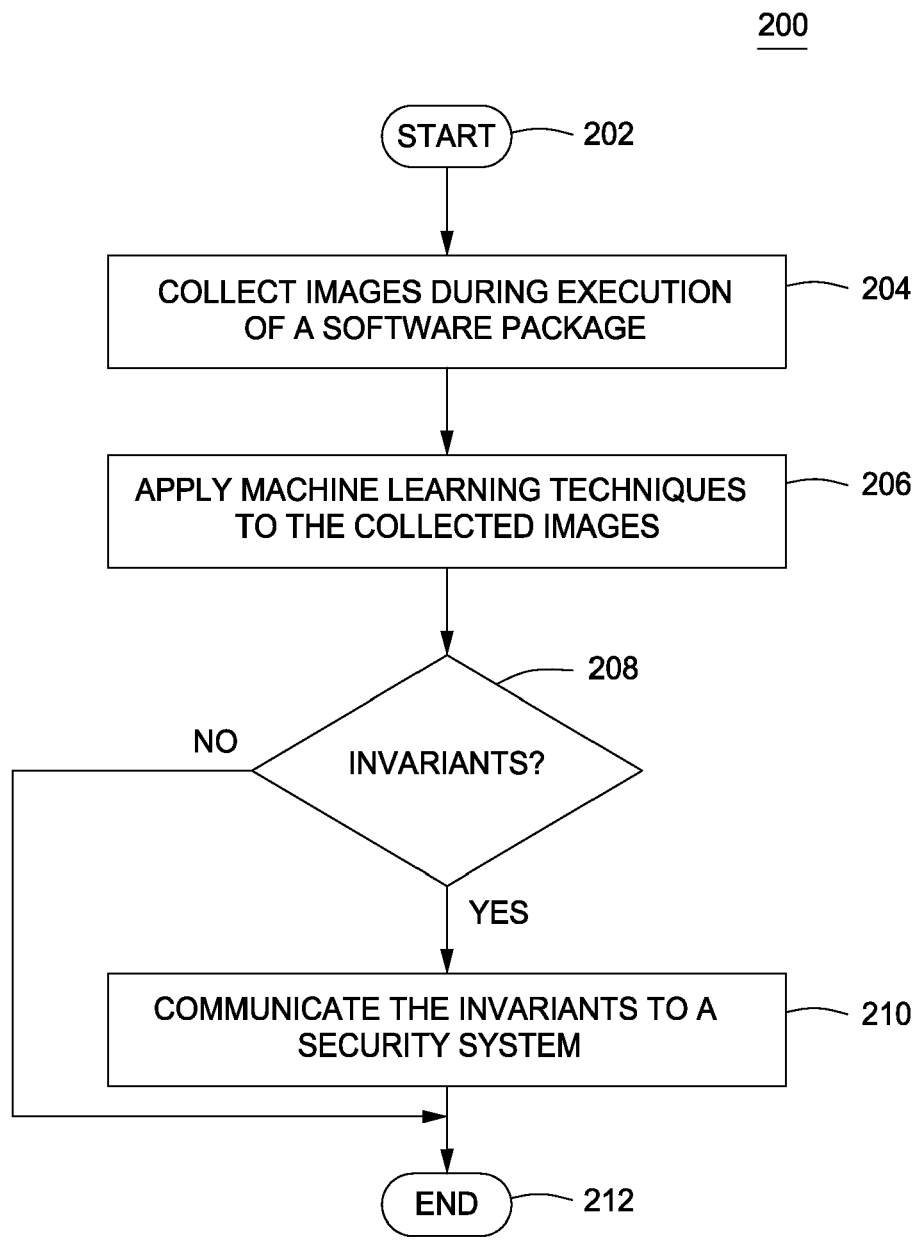
FIG. 2 is a flow diagram of a method for identifying invariants to detect software tampering in accordance with one or more embodiments of the present invention.

FIG. 2 illustrates a method 200 for identifying invariants to detect software tampering, in accordance with one or more embodiments of the invention. The method 200 has been explained with reference to the computer 102 of FIG. 1. The method 200 starts at step 202 and proceeds to step 204.

At step 204, one or more images are collected during the execution of a software package. Alternatively, the one or more images may be collected at various points during (e.g., before and after) installation of the software package. At step 206, one or more machine learning techniques are applied to the collected images. Various embodiments of the step 206 are further discussed below with respect to FIG. 3.

At step 208, a determination as to whether one or more invariants are identified from the collected images. As explained above, a classifier and/or a clustering technique is applied to the collected images to identify the one or more invariants. For example, the rules developed by the classifier to differentiate a clean image from a compromised image comprise the one or more invariants. As another example, the one or more invariants are identified as those present in most or all of a number of clusters (i.e., groups) of the collected images formed by the clustering technique. If it is determined that one or more invariants identified from the collected images (option "YES"), then the method 200 proceeds to step 210. At step 210, the one or more invariants are communicated to a security system (e.g., the security system 104 of FIG. 1). As mentioned above, the security system uses the one or more invariants to monitor and assess software integrity of the software package in run-time. If, at step 208 it is determined that no invariant is identified from the collected images (option "NO"), then the method 200 proceeds to step 212. At step 212, the method 200 ends.

Figure 3:
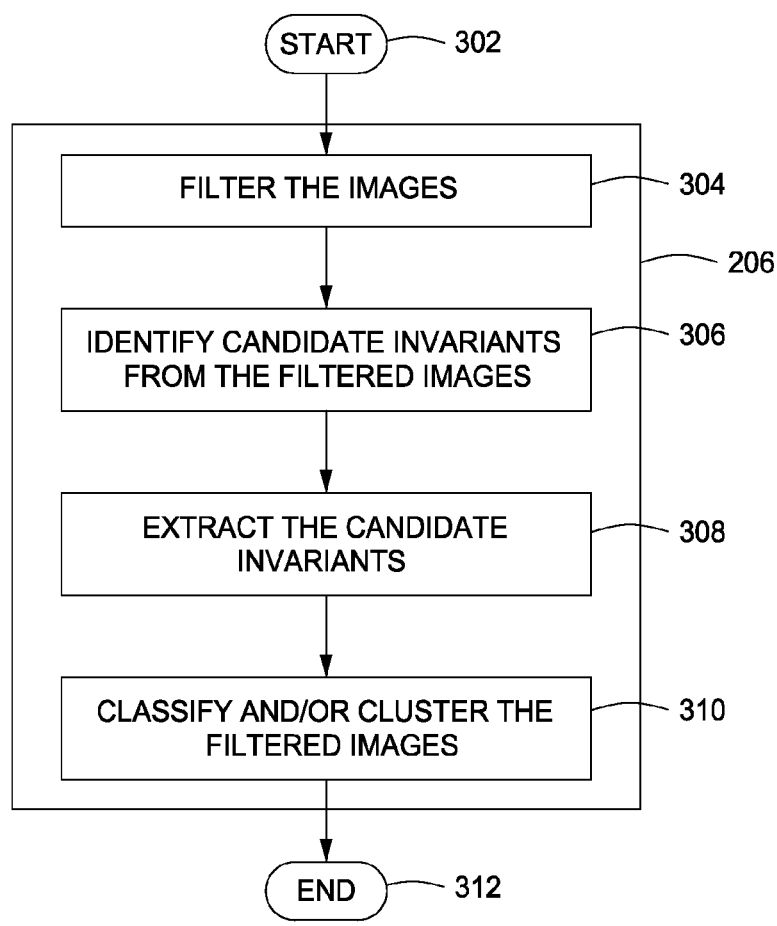
FIG. 3 is a flow diagram of a method for applying machine learning techniques to a plurality of images in accordance with one or more embodiments of the present invention.

FIG. 3 illustrates a method 300 for applying a machine learning technique to a plurality of images. The method 300 starts at step 302 and proceeds to step 304.

At step 304, the plurality of images (e.g., the images 118 of FIG. 1) are filtered (e.g., by the feature module 122 of FIG. 1). As explained above, the filtered images comprise memory that has changed between freeze points associated with execution (e.g., installation) of a software package. At step 306, one or more candidate invariants are identified from the filtered images.

At step 308, the one or more candidate invariants are extracted. At step 310, the plurality of images are classified according to the presence of the candidate invariants. Alternatively, the plurality of images may be clustered into groups based on the presence of the candidate invariants. As explained above, the candidate invariants that are present in all or most of the plurality of images are confirmed as reliable invariants, which may be used to detect software tampering. At step 312, the method 300 ends.

While the foregoing is directed to embodiments of the present invention, other and further embodiments of the invention may be devised without departing from the basic scope thereof, and the scope thereof is determined by the claims that follow.

The invention claimed is:

1. A method of identifying invariants associated with a software package, comprising:
    collecting a plurality of snapshots during execution of the software package;
    applying a machine learning technique to the plurality of snapshots associated with the software package to identify a memory location within the plurality of snapshots to be a candidate invariant, wherein the plurality of snapshots comprise images of memory used during execution of the software package, and wherein applying the machine learning technique further comprises filtering the plurality of snapshots and identifying the candidate invariant from the filtered plurality of snapshots; and
    determining that the candidate invariant is an invariant based on the candidate invariant being present within a majority of the plurality of snapshots.

2. The method of claim 1 further comprising generating the plurality of snapshots based on a schedule.

3. The method of claim 1, wherein the at least one invariant comprises at least one of a static invariant or a semantic invariant.

4. The method of claim 1, wherein applying a machine learning technique further comprises producing feature information, wherein the feature information indicates the memory location within the plurality of snapshots to be the candidate invariant, wherein the feature information is used to identify the invariant.

5. The method of claim 1, wherein applying the machine learning technique further comprises classifying the plurality of snapshots based on a presence of the candidate invariant.

6. The method of claim 1 wherein applying the machine learning technique further comprises:
    extracting the candidate invariant associated with the at least one memory location of the plurality of snapshots; and
    applying at least one of a classifier or a clustering technique to the candidate invariant.

7. The method of claim 5, wherein filtering the plurality of snapshots further comprises applying a delta compression technique to the plurality of snapshots to determine at least one second snapshot.

8. The method of claim 1, wherein the machine learning technique comprises at least one of an n-grams analysis, a bloom filter or a longest common subsequence technique.

9. The method of claim 1 wherein the feature information indicates a memory location read as an opcode as the candidate invariant.

10. The method of claim 1 further comprising determining a violation of the invariant in memory associated with the software package.

11. The method of claim 1 further comprising training a classifier using at least one third snapshot associated with a second software package.

12. The method of claim 1 further comprising monitoring memory associated with the software package to identify malware related to a violation of the invariant.

13. An apparatus for identifying invariants associated with a software package, comprising:
    a snapshot module operating on at least one processor for collecting a plurality of snapshots associated with an execution of a software package;
    a feature module for identifying at least one memory location of the plurality of snapshots as at least one candidate invariant using a machine learning technique, wherein the machine learning technique comprises filtering the plurality of snapshots and identifying the candidate invariant from the filtered plurality of snapshots; and
    an invariant module for selecting at least one invariant from the at least one candidate invariant based on the at least one candidate invariant being present within a majority of the plurality of snapshots.

14. The apparatus of claim 13, wherein the feature module extracts the at least one candidate invariant from the at least one snapshot.

15. The apparatus of claim 13, wherein the invariant module comprises a classifier for identifying the at least one invariant based on a presence of the at least one candidate invariant amongst the at least one snapshot.

16. The apparatus of claim 13, wherein the invariant module performs a clustering technique for establishing the at least one invariant based on a presence of the at least one candidate invariant amongst the at least one snapshot.

17. The apparatus of claim 13, wherein the feature module filters the at least one snapshot using a delta compression technique to determine at least one second snapshot.

18. A system for identifying invariants associated with a software package, comprising:
    a snapshot module operating on at least one processor for collecting a plurality of snapshots associated with a software package, wherein the plurality of snapshots comprise snapshots of memory used during execution of the software package;
    a feature module for identifying a memory location of the plurality of snapshots as a candidate invariant using a machine learning technique, wherein the machine learning technique comprises filtering the plurality of snapshots and identifying the candidate invariant from the filtered plurality of snapshots;
    an invariant module for determining at least one invariant from the at least one candidate invariant based on the at least one candidate invariant being present within a majority of the plurality of snapshots; and
    a security module for monitoring the software package to identify a violation of the at least one invariant.

19. The system of claim 18, wherein the violation of the at least one invariant indicates that memory used during execution of the software package comprises malware.

* * * * *